United States Patent
Mass et al.

(10) Patent No.: US 8,559,731 B2
(45) Date of Patent: Oct. 15, 2013

(54) PERSONALIZED TAG RANKING

(75) Inventors: Yosi Mass, Ramat Gan (IL); Michal Shmueli-Scheuer, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 12/688,978

(22) Filed: Jan. 18, 2010

(65) Prior Publication Data

US 2011/0176737 A1    Jul. 21, 2011

(51) Int. Cl.
*G06K 9/64* (2006.01)

(52) U.S. Cl.
USPC ............ 382/220; 382/217; 382/224; 382/159

(58) Field of Classification Search
USPC .................................. 382/217, 224, 159, 220
See application file for complete search history.

(56) References Cited

U.S. PATENT DOCUMENTS

| | | | |
|---|---|---|---|
| 5,682,249 A * | 10/1997 | Harrington et al. | 358/426.02 |
| 5,802,361 A * | 9/1998 | Wang et al. | 382/217 |
| 5,825,843 A * | 10/1998 | Kobayashi | 378/20 |
| 7,360,160 B2 | 4/2008 | Matz | |
| 7,856,380 B1 * | 12/2010 | Latin-Stoermer et al. | 705/27.1 |
| 7,949,191 B1 * | 5/2011 | Ramkumar et al. | 382/209 |
| 2004/0189687 A1 * | 9/2004 | Yamamoto | 345/716 |
| 2008/0114778 A1 | 5/2008 | Siegel et al. | |
| 2008/0144943 A1 * | 6/2008 | Gokturk et al. | 382/224 |
| 2009/0063568 A1 | 3/2009 | Choe et al. | |
| 2010/0177956 A1 * | 7/2010 | Cooper et al. | 382/159 |
| 2010/0211602 A1 * | 8/2010 | Menon et al. | 707/772 |

OTHER PUBLICATIONS

Zhou Hong et al., "Query Expansion by Text and Image Features in Image Retrieval", Journal of Visual Communication and Image Representation vol. 9, No. 4, December, pp. 287-299, 1998.

Yan Rong et al. "Semantic Concept-Based uery Expansion and Re-ranking for Multimedia Retrieval", Multimedia 2007.

Ziyu Guan et al., "Personalized tag recommendation using graph-based ranking on multi-type interrelated objects", Annual ACM Conference on Research and Development in Information Retrieval, Proceedings of the 32nd International ACM SIGIR conference on Research and development in information retrieval, Boston, MA, USA, 2009, pp. 540-547.

K. Kise et al, "A System for Recommending Tags of Images Using Co-Occurrence of Tags and Similar Images", Speech and Image Processing, Recognition, Mar. 2009 vol. 129-C No. 3 Publisher: http://www2.iee.or.jp/ver2/honbu/14-magazine/log/2009/c2009e.htm.

(Continued)

*Primary Examiner* — Vu Le
*Assistant Examiner* — Aklilu Woldemariam (57) ABSTRACT

Personalized tag ranking of images, including identifying within a reference image collection any images that are similar to an input image, identifying within a source image collection any images that have associated tags that are similar to a set of input tags associated with the input image, identifying among the images identified in the reference image collection any images that are similar to the images identified in the source image collection, and calculating a weight for each of a plurality of tag pairs, where each of the tags in each of the tag pairs is associated with a different subset of the images in the reference image collection identified as being similar to the images identified in the source image collection, and ranking the input tags of the input image in accordance with a predefined ranking function as applied to the tag pair weights.

15 Claims, 9 Drawing Sheets

(56) References Cited

OTHER PUBLICATIONS

Zheshen Wang et al., "Learning to Recommend Tags for On-line Photos, Computer Science and Engineering", Arizona State University, Copyright 2009, ISBN 978-1-4419-0056-2, DOI 10.1007/978-1-4419-0056-2_29, pp. 1-9 Publisher: Springer US.

Dong Liu, et al., "Tag Ranking", WWW 2009, Apr. 20±24, 2009, Madrid, Spain. p. 351-360.

S. Baluja. "VisualRank: Applying PageRank to Large-Scale Image Search". In Transactions on Pattern Analysis and Machine Intelligence, 2008.

Garg et al. "Personalized, Interactive Tag Recommendation for Flickr". In Proceedings of the 2nd ACM International Conference on Recommender Systems, Oct. 23-25, 2008, Lausanne, Switzerland, pp. 67-64.

N. Garg et al. "Personalized, Personalized Tag Suggestions for Flickr". WWW 2008, Apr. 21±25, 2008, Beijing, China. p. 1063-1064.

Chia-Chuan Hung, et al. "Tag-Based User Profiling for Social Media Recommendation". AAAI08, Workshops. p. 49-55, 1998.

Cayzer, S. et al., "Learning user profiles from tagging data and leveraging them for personal(ized) information access". In Proceedings of the Workshop on Tagging and Metadata for Social Information Organization, 16th International World Wide Web Conference (WWW2007).

Kern P. et al., "Recommending tags for pictures based on text, visual content and user context". Proceedings of the 2008 Third International Conference on Internet and Web Applications and Services. p. 506-511.

Stefanie Lindstaedt, Roland M?rzinger, Robert Sorschag, Viktoria Pammer, Georg Thallinger. Automatic image annotation using visual content and folksonomies. Multimedia Tools and Applications 2009. p. 97-113.

Christos Faloutsos, "A novel optimization approach to efficiently process aggregate similarity queries in metric access" methods. CIKM 2008: 193-202. Oct. 26-30, 2008.

Ronald Fagin et al, "Optimal aggregation algorithms for middleware", PODS '01: Proceedings of the twentieth ACM SIGMOD-SIGACT-SIGART symposium on Principles of database systems,, 2001 p. 1-40.

Haubold Alexander et al. Semantic Concept-Based uery Expansion and Re-ranking for Multimedia Retrieval, Multimedia 2007.

* cited by examiner

PERSONALIZED TAG RANKING

FIELD OF THE INVENTION

The present invention relates to image tagging in general, and more particularly to personalized tag ranking based on personal user information.

BACKGROUND OF THE INVENTION

Image tagging, or using keywords to categorize images according to the information they contain, is a useful way to organize collections of images, such as on web sites like Flickr™. When done properly, tagging can facilitate searching images or navigating such web sites. However, inconsistencies resulting from words having multiple context-related definitions, and from user subjectivity regarding these definitions, often yield irrelevant search results. For example, an image of a family gathering may tagged with the tag 'home'. If a user who is interested in architecture searches for images tagged with 'home', the image of the family gathering, which is irrelevant to the field of architecture, may be returned in the search result.

SUMMARY OF THE INVENTION

In one aspect of the invention a system is provided for personalized tag ranking of images, the system including a reference image searcher configured to identify within a reference image collection any images that are similar to an input image in accordance with a first predefined image similarity measurement, a source image searcher configured to identify within a source image collection any images that have associated tags that are similar to a set of input tags in accordance with a predefined tag similarity measurement, where the set of input tags is associated with the input image, an image comparer configured to identify among the images identified by the source image searcher any images that are similar to the images identified by the reference image searcher in accordance with a second predefined image similarity measurement, and calculate a weight for each of a plurality of tag pairs, where each of the tags in each of the tag pairs is associated with a different subset of the images identified by the image comparer, and where the weight is calculated in accordance with a predefined weight function, and a tag ranker configured to rank the input tags of the input image in accordance with a predefined ranking function as applied to the tag pair weights.

In another aspect of the invention a system is provided for personalized tag ranking of images, the system including a reference image searcher configured to identify within a reference image collection any images that are similar to an input image in accordance with a first predefined image similarity measurement, a source image searcher configured to identify within a source image collection any images that have associated tags that are similar to a set of input tags in accordance with a predefined tag similarity measurement, where the set of input tags is associated with the input image, and represent the images identified by the source image searcher in a plurality of groups, where each of the groups is associated with a different tag in the set of input tags, an image comparer configured to identify within the groups of images identified by the source image searcher any images that are similar to the images identified by the reference image searcher in accordance with a second predefined image similarity measurement, represent the images identified by the image comparer in a plurality of subsets of the groups, where each of the subsets is associated with the tag of the group of which the subset is a subset, and calculate for any pair of the subsets a similarity value between the images represented by the pair of subsets in accordance with a third predefined similarity measurement, and a weight for each pair of the tags associated with the pair of subsets as a predefined function of the similarity value and a predefined function of a tag-based similarity value calculated between the pair of tags, and a tag ranker configured to build a tag graph of a plurality of nodes, where each node in the tag graph preferably corresponds to a different tag in the set of input tags, assign a weight to each of a plurality of edges of the tag graph from a corresponding weight of the pair of the tags, and rank the nodes in the graph in accordance with a predefined ranking function, thereby ranking the input tags of the input image.

In other aspects of the invention methods and computer program products are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
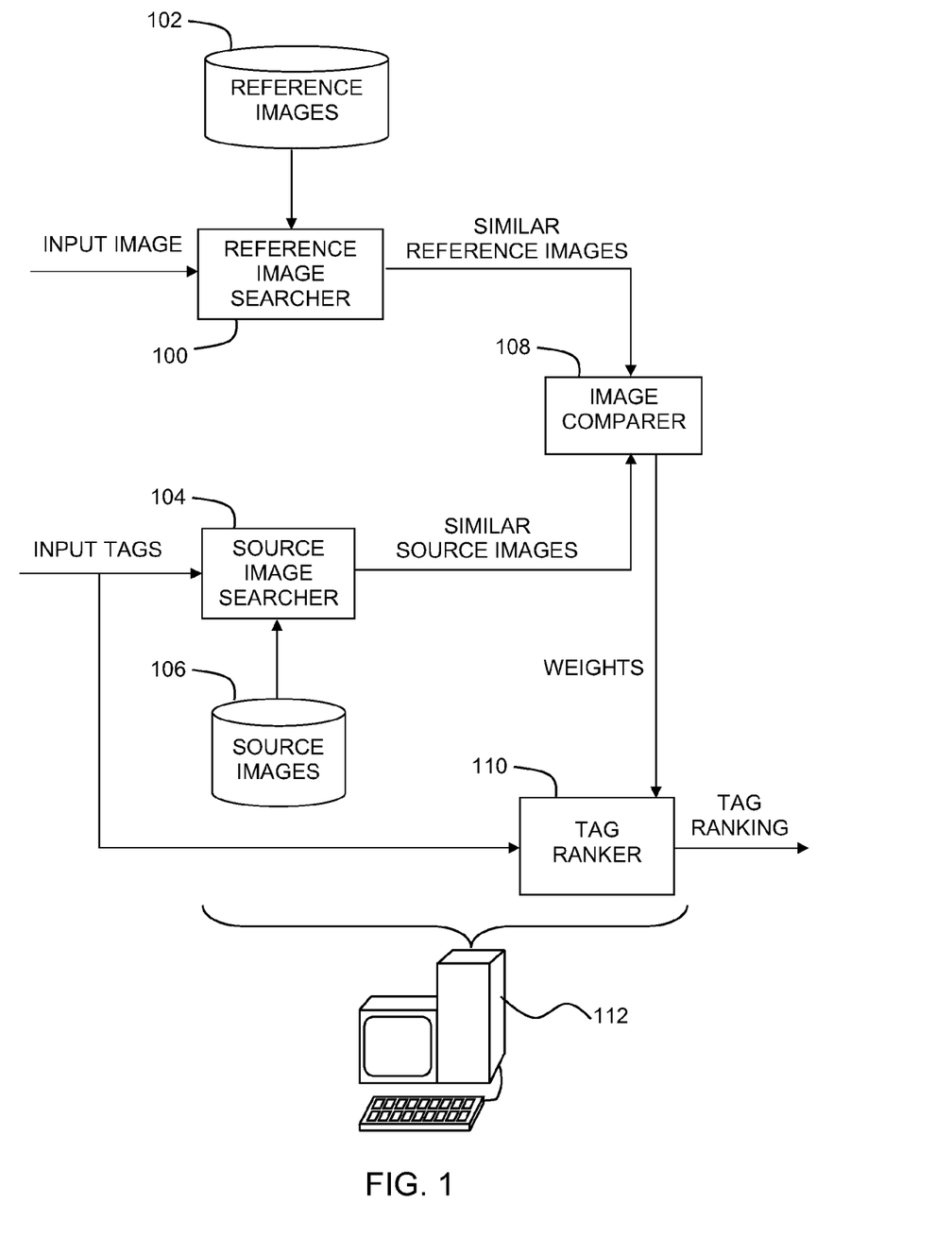
FIG. 1 is a simplified conceptual illustration of a system for ranking tagged images, constructed and operative in accordance with an embodiment of the invention.

Reference is now made to FIG. 1 which is a simplified conceptual illustration of a system for personalized tag ranking of images, constructed and operative in accordance with an embodiment of the invention. In the system of FIG. 1 a reference image searcher 100 receives or otherwise accesses an input image, such as a JPEG image. Reference image searcher 100 preferably searches a reference image collection 102 for images that are similar to the input image using any conventional technique and using any known similarity measure, such as, but not limited to, similarity by any combination of color histograms, textures, edges, etc. Reference image collection 102 preferably includes images that relate to the individual interests of a user of the system of FIG. 1, such as that user's private collection of images, where the images in reference image collection 102 may or may not have associated tags, where a tag is a descriptive word or phrase identifying elements or characteristics of an image.

A source image searcher 104 receives or otherwise accesses a set of input tags that have been associated with the input image using any known tagging method. Source image searcher 104 preferably searches a source image collection 106 for images that are tagged with tags that are similar to the input tags, where source image collection 106 may include a repository of tagged images, such as a library of publicly available tagged images, and where tag similarity is defined using any known text-based similarity measure. Source image searcher 104 preferably retrieves and represents the results of the search as image tag groups, where each group corresponds to one of the input tags. For example, if source image searcher 104 searches source image collection 106 for images having any of the tags 'house', 'mountain', and 'sky', then the search results may be represented by three groups, the first group corresponding to the tag 'house' and including references to images tagged with a tag similar to 'house', the second group corresponding to the tag 'mountain' and including references to images tagged with a tag similar to 'mountain', and the third group corresponding to the tag 'sky' and including references to images tagged with a tag similar to 'sky'.

Using any conventional image comparison technique and any known image similarity measurement, such as, but not limited, to similarity by any combination of color histograms, textures, edges, etc., an image comparer 108 searches the images found during the search of source image collection 106 and represented by the groups described above to identify images that are similar to the images found during the search of reference image collection 102. Image comparer 108 preferably represents any similar images found in each group as a subset of the group, where each subset is preferably identified with an associated tag in a manner similar to its parent group.

Image comparer 108 calculates a similarity value for any, and preferably every, possible pair of subsets, and thus, for corresponding pairs of associated tags, by comparing the images in those subsets to arrive at a similarity value between the subsets, such as by calculating similarity values between any, and preferably every, pair of images, one image from each subset, and then summing the image pair similarity values. Image comparer 108 preferably calculates a weight for any, and preferably every, pair of tags as a function of the similarity value calculated above for a corresponding pair of subsets, preferably combined with a function of a tag-based similarity value calculated between the two tags, such as by using a predefined text-based measure of tag concurrency.

A tag ranker 110 receives or otherwise accesses the input tags and builds a tag graph using any conventional method where each node in the tag graph preferably corresponds to a different input tag. Tag ranker 110 obtains the weights for the pairs of tags calculated above and assigns the weights to the edges of the tag graph. For example, the weight calculated for the tag pair 'house-mountain' is assigned to the edge in the graph connecting the node 'house' with the node 'mountain'. Tag ranker 110 produces a ranking of the nodes in the graph, and thus a ranking of the input tags associated with the input image, using any conventional technique, such as by obtaining a relevance measure for the nodes by performing a random walk over the weighted graph.

Any of the elements shown are preferably executed by or otherwise made accessible to a computer 112, such as by implementing any of the elements in computer hardware and/or in computer software embodied in a computer-readable medium in accordance with conventional techniques.

Figure 2:
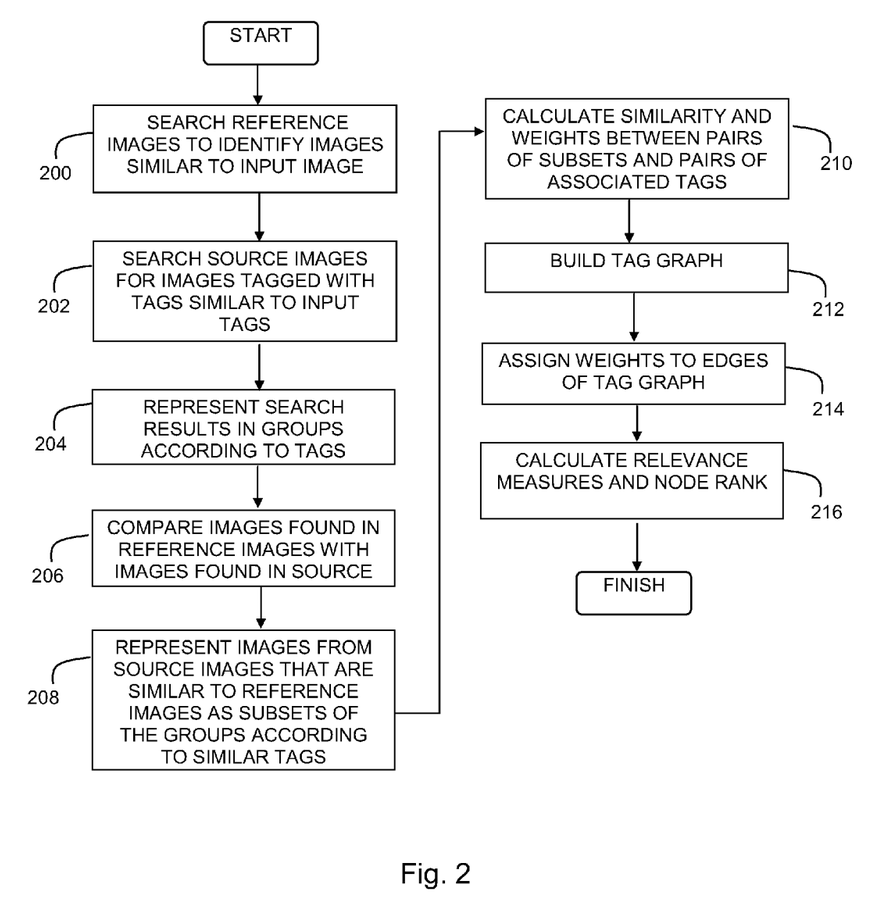
FIG. 2 is a simplified flowchart illustration of an exemplary method of operation of the system of FIG. 1, operative in accordance with an embodiment of the invention.

Reference is now made to FIG. 2 which is a simplified flowchart illustration of a method of operation of the system of FIG. 1, operative in accordance with an embodiment of the invention. In the method of FIG. 2, a search is conducted of a reference image collection to identify images that are similar to an input image (step 200). Another search is conducted of a source image collection to identify images tagged with tags that are similar to a set of input tags associated with the input image (step 202). The results of the search of the source image collection are grouped according to images having similar tags (step 204). The images found during the search of the reference image collection are compared to the images in each group found during the search of the source image collection (step 206) in order to identify subsets of similar images grouped according to similar tags (step 208). A similarity value is calculated for different pair of subsets, and thus, for corresponding pairs of associated tags, by comparing the images in the subsets, and a weight is calculated as a function of the similarity calculated above, preferably combined with a function of a tag-based similarity value calculated between the two tags (step 210). A tag graph is built using any conventional method where a node in the tag graph preferably corresponds to an input tag (step 212). The weights calculated above and associated with the different pairs of tags are assigned to the edges of the tag graph, where each weight is assigned to the edge connecting the two nodes corresponding to the two associated tags (step 214). A relevance measure for the nodes is calculated, such as by performing a random walk over the weighted graph, and the rank for each node, and thus a ranking of the input tags associated with the input image, is calculated as a function of the relevance measure (step 216).

Figure 3A:
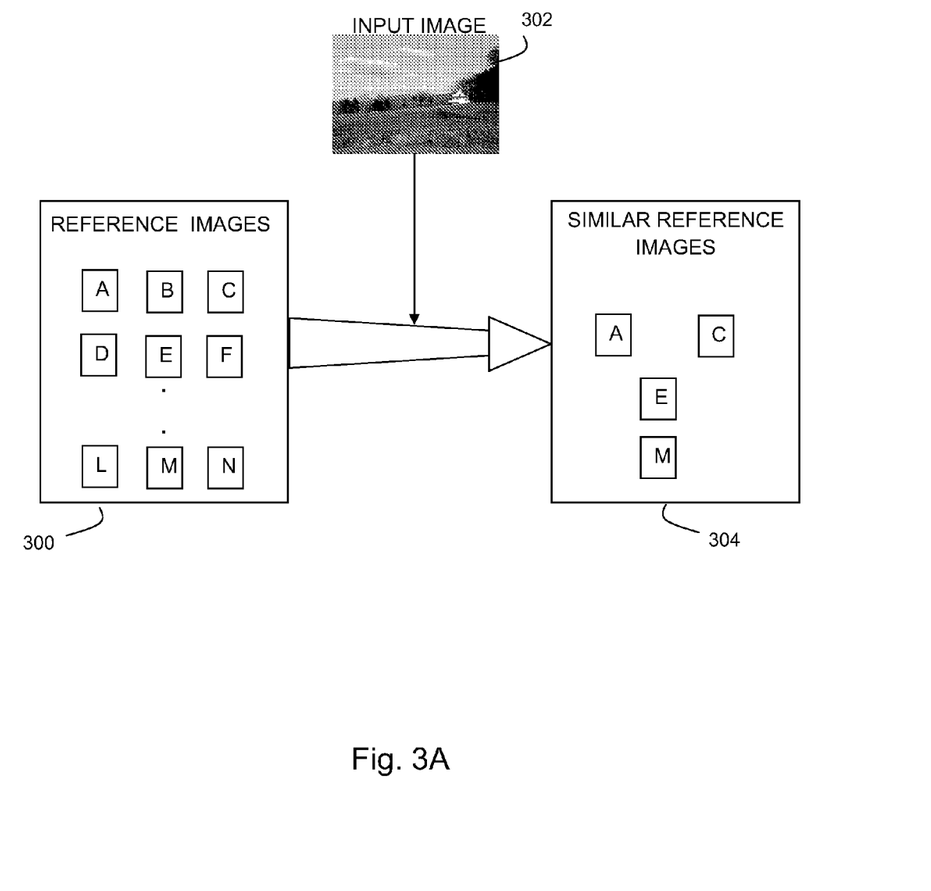
FIGS. 3A-3D are simplified conceptual illustrations of an implementation of a system for ranking tagged images, constructed and operative in accordance with an embodiment of the invention.
Figure 3B:
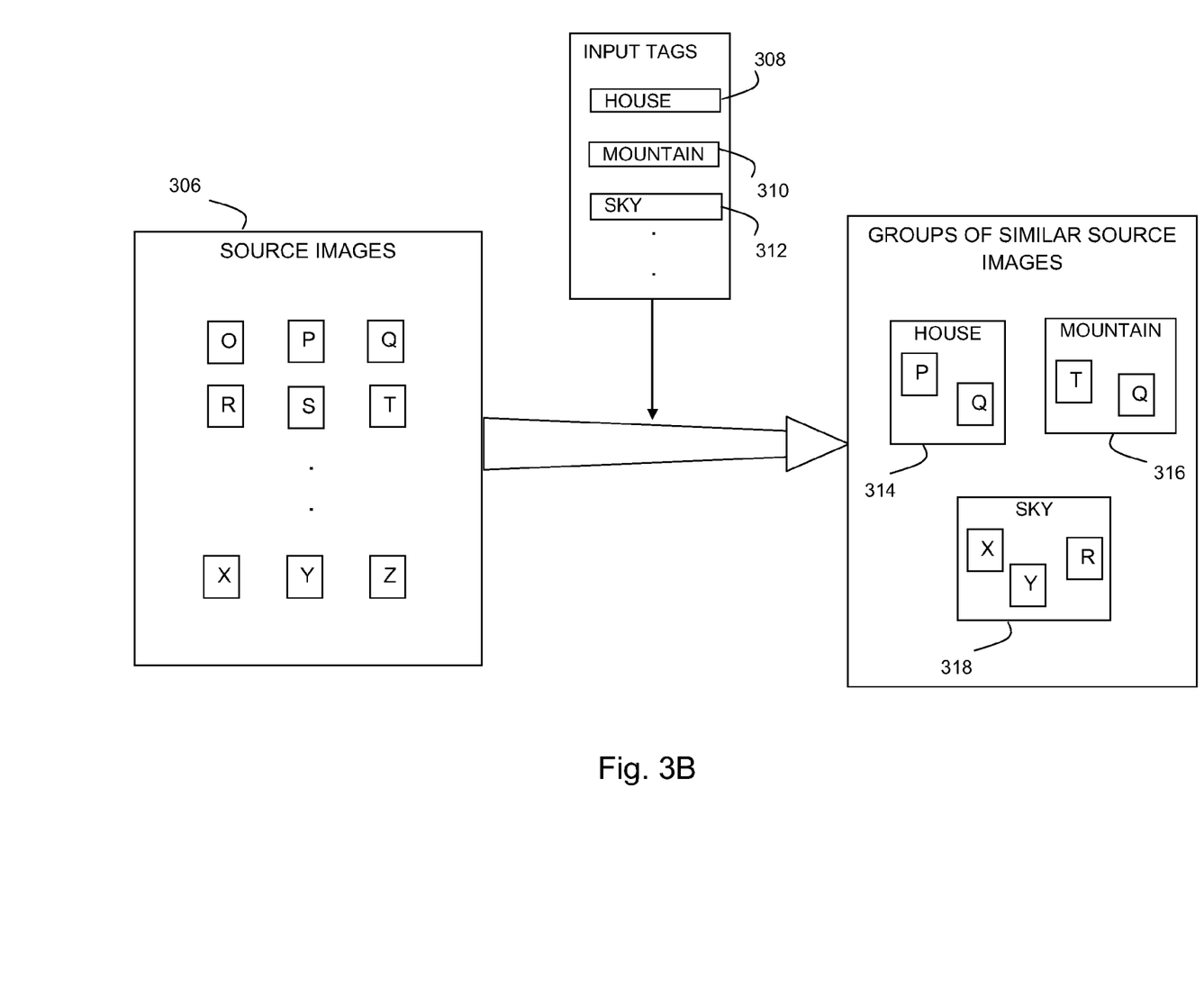

Reference is now made to FIGS. 3A-3D which are examples of an implementation of the system and method described above with respect to FIGS. 1 and 2. Referring to FIG. 3A, a collection of reference images 300 is shown. Reference collection 300, which includes images A . . . N, is searched for images similar to an input image 302, and the results of the search, images A, C, E, and M is stored in a collection of similar reference images 304. Referring to FIG. 3B, a collection of source images 306 is shown, where the images in collection 306, 0 . . . Z, are tagged. Collection 306 is searched for images tagged with the tags of input image 302, tag 308 'house', tag 310 'mountain', and tag 312 'sky'. The results of the search are represented by group 314, group 316 and group 318 corresponding to tags 308, 310, and 312, respectively, where group 314 associated with the tag 'house' includes images P and Q which are tagged with 'house', group 316 associated with the tag 'mountain' includes images T and Q which are tagged with 'mountain', and group 318 associated with the tag 'sky' includes images X, Y, and R which are tagged with 'sky'.

Figure 3C:
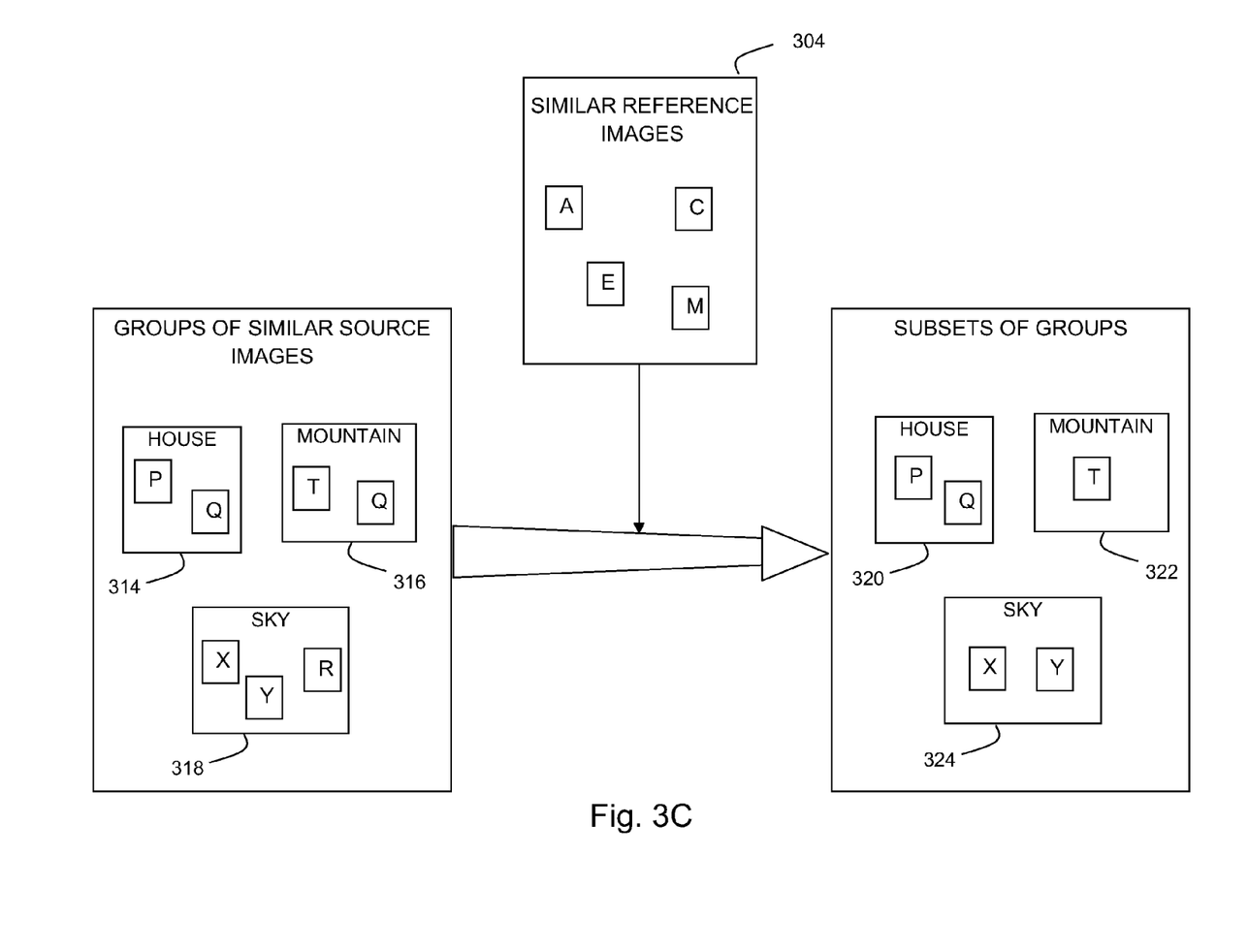

Referring to FIG. 3C, the images in groups 314, 316, and 318 are compared with the images included in similar reference images 304. The images from groups 314, 316, and 318 that are similar to the images in collection 304 are stored in subsets 320, 322, and 324, where subset 320 which is associated with the tag 'house' now includes images P and Q, whereas subset 322 which is associated with the tag 'mountain' now only includes image T, and subset 318 which is associated with the tag 'sky' now only includes images X, and Y. A similarity measurement is calculated between images P and T from the subset pair 320-322, and weight W1 corresponding to the tag pair 'house-mountain' is calculated as a function of this similarity measurement. In a similar manner, weights W2 corresponding to the tag pair 'house-sky', and W3 corresponding to the tag pair 'mountain-sky', are calculated as functions of the similarity measurements between the subset pairs 320-324, and 322-324, respectively by comparing the images in those subset pairs.

Figure 3D:
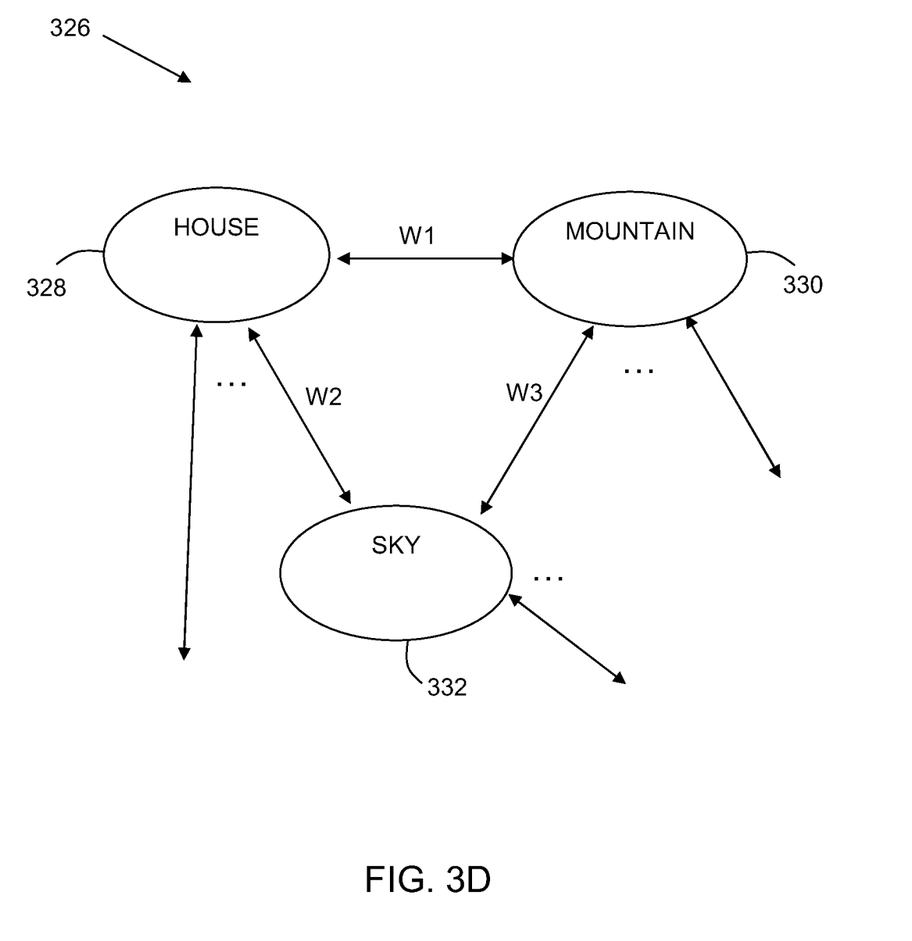

Referring to FIG. 3D, a tag graph 326 is constructed where nodes 328, 330, and 332 of graph 326 represent tags 308, 310, and 312 respectively. Weights W1, W2, and W3 calculated above are assigned to the appropriate edges of graph 326 as follows: W1 corresponding to the tag pair 'house-mountain' is assigned to the edge connecting node 328 to node 330, W2 corresponding to the tag pair 'house-sky' is assigned to the edge connecting node 328 to node 332, and W3 corresponding to the tag pair 'mountain-sky' is assigned to the edge connecting node 330 to node 332. A random walk is performed over weighted graph 326 using conventional techniques, and a relevance measure is calculated for nodes 328, 330, 332 preferably conforming to the results of the random walk. Tags 308, 310, and 312 which correspond to nodes 328, 330, and 332 respectively, are preferably ranked in accordance with the relevance measures calculated above for nodes 328, 330, and 332.

Figure 4:
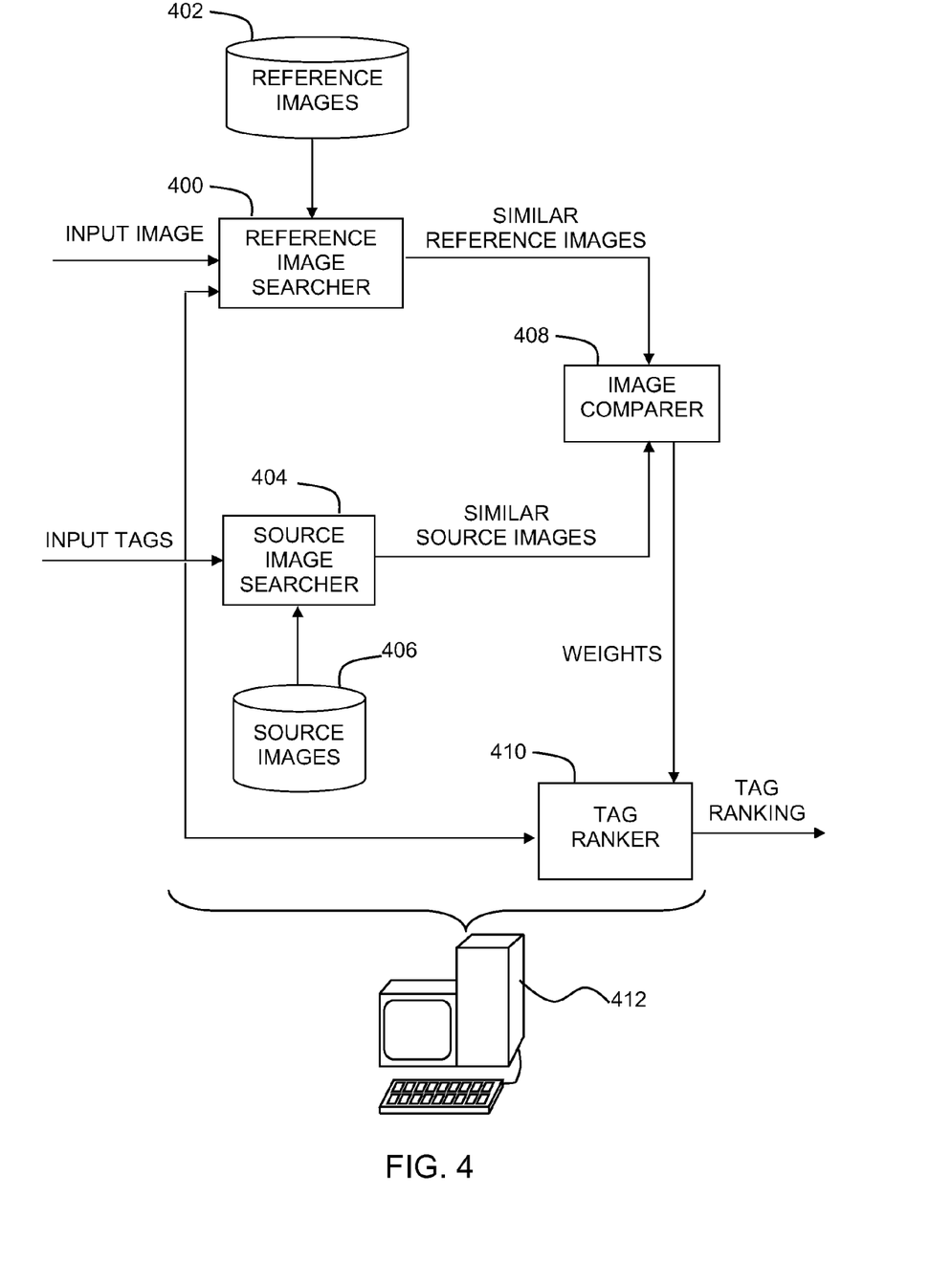
FIG. 4 is a simplified conceptual illustration of a system for ranking tagged images, constructed and operative in accordance with an embodiment of the invention.

Reference is now made to FIG. 4 which is a simplified conceptual illustration of another embodiment of a system for ranking tagged images. The system of FIG. 4 is substantially similar to the system of FIG. 1 with the notable exception that images in reference images 402 may also be tagged. These tags may be utilized to improve the search of reference images 402 as follows. Reference image searcher 400 receives or otherwise accesses both the input image and its associated input tags, and searches reference images 402 using both the input image as a query image as well as the input tags using any conventional method, such as by defining a similarity measurement as a combination, such as, but not limited to, a sum or a weighted sum of both tag similarity and image similarity. Upon retrieving the search results from reference images 402 the system of FIG. 4 is similar to that of FIG. 1 described above.

Figure 5:
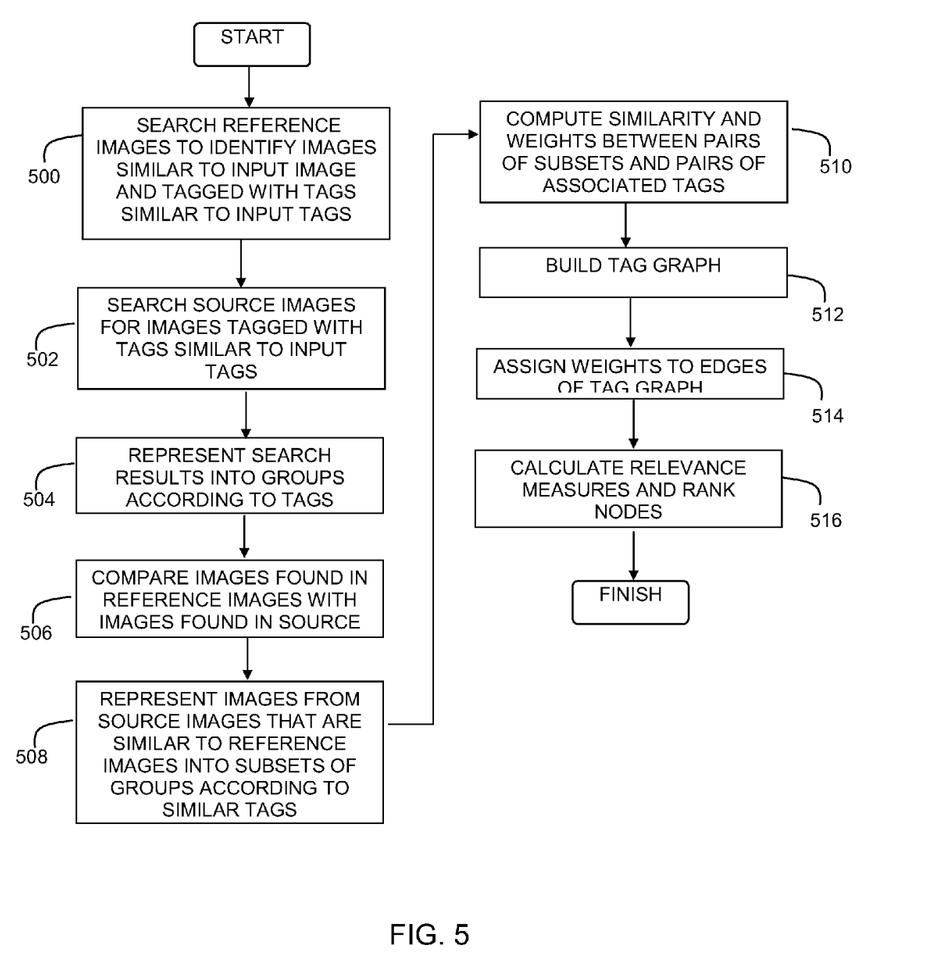
FIG. 5 is a simplified flowchart illustration of an exemplary method of operation of the system of FIG. 4, operative in accordance with an embodiment of the invention.

Reference is now made to FIG. 5 which is simplified conceptual flowchart illustration of a method of operation of the system of FIG. 4 operative in accordance with an embodiment of the invention. The method of FIG. 5 is substantially similar to that of FIG. 2 with the notable exception that at step 500, the collection of reference images is searched with both the input image as a query image as well as the set of input tags corresponding to the input image is accessed, by defining a similarity measurement as a function of both image similarity as well as similarity between tags tagging those images.

Figure 6:
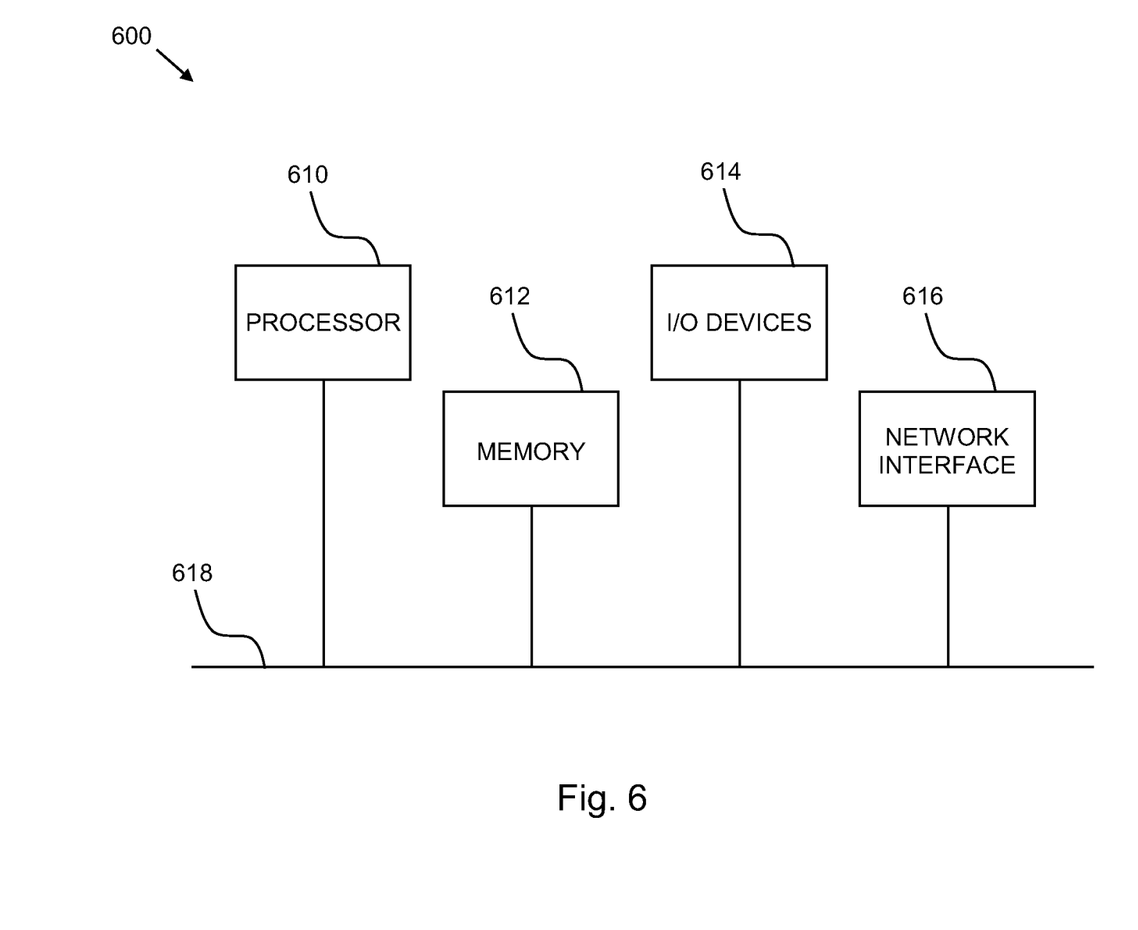
FIG. 6 is a simplified block diagram illustration of an exemplary hardware implementation of a computing system, constructed and operative in accordance with an embodiment of the invention.

Referring now to FIG. 6, block diagram 600 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for personalized tag ranking of images, the system comprising:
    a reference image searcher configured to identify within a reference image collection any images that are similar to an input image in accordance with a first predefined image similarity measurement;
    a source image searcher configured to identify within a source image collection any images that have associated tags that are similar to a set of a plurality of input tags in accordance with a predefined tag similarity measurement, wherein said set of input tags is associated with said input image, and wherein each of said input tags includes at least one word describing a characteristic of said input image;
    an image comparer configured to
        identify among said images identified by said source image searcher any images that are similar to said images identified by said reference image searcher in accordance with a second predefined image similarity measurement, and
        calculate a weight for each of a plurality of tag pairs, wherein each of said tags in each of said tag pairs is associated with a different subset of said images identified by said image comparer, and wherein said weight is calculated in accordance with a predefined weight function; and
    a tag ranker configured to rank said plurality of input tags of said input image in accordance with a predefined ranking function as applied to said tag pair weights.

2. The system according to claim 1 wherein said source image searcher is configured to represent said images identified by said source image searcher in a plurality of groups, wherein each of said groups is associated with a different tag in said set of input tags.

3. The system according to claim 2 wherein said image comparer is configured to represent said images identified by said image comparer in a plurality of subsets of said groups, wherein each of said subsets is associated with said tag of said group of which said subset is a subset.

4. The system according to claim 3 wherein said image comparer is configured to calculate a similarity value between said images represented by a pair of said subsets in accordance with a third predefined image similarity measurement.

5. The system according to claim 4 wherein said image comparer is configured to calculate said weight wherein said predefined weight function is applied to said similarity value and a tag-based similarity value calculated between said tags associated with said pair of subsets.

6. The system according to claim 1 wherein said tag ranker is configured to
    build a tag graph of a plurality of nodes, wherein each node in said tag graph corresponds to a different tag in said set of input tags, and
    assign each of said weights to each of a plurality of edges of said tag graph corresponding to one of said tag pairs.

7. A system for personalized tag ranking of images, the system comprising:

a reference image searcher configured to identify within a reference image collection any images that are similar to an input image in accordance with a first predefined image similarity measurement;

a source image searcher configured to
- identify within a source image collection any images that have associated tags that are similar to a set of a plurality of input tags in accordance with a predefined tag similarity measurement, wherein said set of input tags is associated with said input image, and wherein each of said input tags includes at least one word describing a characteristic of said input image, and
- represent said images identified by said source image searcher in a plurality of groups, wherein each of said groups is associated with a different tag in said set of input tags;

an image comparer configured to
- identify within said groups of images identified by said source image searcher any images that are similar to said images identified by said reference image searcher in accordance with a second predefined image similarity measurement,
- represent said images identified by said image comparer in a plurality of subsets of said groups, wherein each of said subsets is associated with said tag of said group of which said subset is a subset, and
- calculate for any pair of said subsets
  - a similarity value between said images represented by said pair of subsets in accordance with a third predefined similarity measurement, and
  - a weight for each pair of said tags associated with said pair of subsets as a predefined function of said similarity value and a predefined function of a tag-based similarity value calculated between said pair of tags; and a tag ranker configured to
- build a tag graph of a plurality of nodes, wherein each node in said tag graph preferably corresponds to a different tag in said set of input tags,
- assign a weight to each of a plurality of edges of said tag graph from a corresponding weight of said pair of said tags, and
- rank said nodes in said graph in accordance with a predefined ranking function, thereby ranking said plurality of input tags of said input image.

8. A system according to claim 7 wherein said reference image searcher is configured to identify said images by performing a content-based search using said input image as a query image.

9. A system according to claim 7 wherein said image similarity measurement is a measurement of similarity of any combination of color histograms, textures, and edges.

10. A system according to claim 7 wherein said reference image collection includes a plurality of images that relate to the individual interests of a user.

11. A system according to claim 7 wherein any of said images in said reference image collection have an associated tag identifying an image element or characteristic.

12. A computer program product for personalized tag ranking of images, the computer program product comprising:

a non-transitory computer-readable storage medium; and computer-readable program code embodied in said computer-readable storage medium, wherein said computer-readable program code is configured to
- identify within a reference image collection any images that are similar to an input image in accordance with a first predefined image similarity measurement;
- identify within a source image collection any images that have associated tags that are similar to a set of a plurality of input tags in accordance with a predefined tag similarity measurement, wherein said set of input tags is associated with said input image, and wherein each of said input tags includes at least one word describing a characteristic of said input image;
- identify among said images identified in said reference image collection any images that are similar to said images identified in said source image collection in accordance with a second predefined image similarity measurement, and
- calculate a weight for each of a plurality of tag pairs, wherein each of said tags in each of said tag pairs is associated with a different subset of said images in said reference image collection identified as being similar to said images identified in said source image collection, and wherein said weight is calculated in accordance with a predefined weight function; and
- rank said plurality of input tags of said input image in accordance with a predefined ranking function as applied to said tag pair weights.

13. The computer program product according to claim 12 wherein said computer-readable program code is configured to represent said images identified in said source image collection in a plurality of groups, wherein each of said groups is associated with a different tag in said set of input tags.

14. The computer program product according to claim 13 wherein said computer-readable program code is configured to represent in a plurality of subsets of said groups said images in said reference image collection identified as being similar to said images identified in said source image collection, wherein each of said subsets is associated with said tag of said group of which said subset is a subset.

15. The computer program product according to claim 14 wherein said computer-readable program code is configured to
- calculate a similarity value between said images represented by a pair of said subsets in accordance with a third predefined image similarity measurement, and
- calculate said weight wherein said predefined weight function is applied to said similarity value and a tag-based similarity value calculated between said tags associated with said pair of subsets.

* * * * *